June 21, 1960 H. BOOCHS 2,942,064

CONTROL APPARATUS

Filed Sept. 17, 1956

Inventor:
Hans Boochs
BY: Michael S. Striker
Agt.

United States Patent Office 2,942,064

Patented June 21, 1960

2,942,064

CONTROL APPARATUS

Hans Boochs, Hildesheim-Neuhof, Germany, assignor to Blaupunkt-Werke G.m.b.H., Hildesheim, Germany Filed Sept. 17, 1956, Ser. No. 614,774

Claims priority, application Germany Sept. 15, 1955

1 Claim. (Cl. 178—7.5)

The present invention relates to improvements in television receiver circuits. More particularly, the present invention relates to an apparatus for automatically regulating the brightness of a picture tube used in a television receiver.

Under the standards set up by the Federal Communications Commission, the black signal level which is used to indicate when the picture tube of a television receiver is dark, must be maintained at some fixed proportion to the carrier wave used in the transmission of television signals. The present standard sets the black signal level at 75% of the carrier amplitude. In order to provide the proper basic brightness in the picture of the picture tube of a television receiver, it is necessary, that the black signal level be maintained at some fixed value.

With conventional receiver circuits changes in the proportions between the various amplitudes in the carrier signal or in the amplification of these impulses cause changes in the black signal level in the television receiver. Due to such changes further regulations are needed in the television receiver. Accordingly, in conventional television receiver circuits the adjustment of the picture brightness and the picture contrast are dependent one upon the other. Therefore, it is necessary that two regulating apparatuses be operated in order to provide the proper picture. It is well known that the layman cannot properly attain the ideal picture transmitted from the television transmitter due to the adjustments necessary in the two different regulating apparatus.

There have been many conventional arrangements which have attempted to automatically fix the black signal level so that only the contrast regulation will have to be operated at the television receiver. One such arrangement provides a capacitor between the video rectifier and the picture tube. In such an arrangement the value of the black signal level is dependent upon the content of the picture. In another arrangement a leveling diode has been used but this introduces many difficulties since the value at which the leveling diode fixes its potential is dependent upon the synchronizing impulse contained in the transmitted television signal. In order to use such leveling diode it has become necessary to filter out the synchronizing impulse before the television signal is applied to the leveling diode.

The present invention overcomes the difficulties of the prior art apparatus by providing an electrically conductive coupling between the video amplifier and the picture tube. In addition, in the apparatus incorporating the principles of the present invention, a portion of the signal applied to the cathode of the picture tube is rectified and added to the biassing potential on the control electrode of the picture tube. In this manner, the black signal level is always maintained at its proper value.

It is accordingly an object of the present invention to overcome the disadvantages of prior art apparatus.

A second object of the present invention is to provide a new and improved apparatus for automatically controlling the brightness of a picture used in television receivers.

Another object of the present invention is to provide a new and improved apparatus for maintaining the black signal level constant in a picture tube used in television receivers.

A further object of the present invention is to provide a new and improved apparatus wherein the black signal level of picture tubes of television receivers is maintained constant by conductively coupling the video rectifier of the television receiver to the cathode on the picture tube and to rectify a portion of the signal applied to the cathode, the rectified voltage being applied to the control electrode of the picture tube and added to the bias potential thereof.

With the above objects in view, the present invention mainly consists of an arrangement for automatically controlling the brightness in a cathode ray tube used as a picture tube for a television receiver, the cathode ray tube having at least a cathode and a control electrode. This arrangement includes input means connected in circuit with the cathode of the cathode ray tube and adapted to have a voltage signal applied thereto to be displayed on the cathode ray tube, a rectifier connected in circuit with the cathode, an electrically conductive coupling connected in circuit between the rectifier and the cathode so that at least a portion of the voltage signal applied to the cathode is rectified by the rectifier, and means connected in circuit between the rectifier and the control electrode for applying at least a portion of the voltage rectified in the rectifier to the control electrode of the cathode ray tube.

In a preferred embodiment of the present invention the polarity of the rectified voltage applied to the control electrode of the cathode ray tube is negative and is added to the bias potential of the control electrode.

In yet another preferred embodiment of the present invention the portion of the voltage signal that is rectified is equal to the amplitude of the black signal level which in turn has an amplitude which is smaller than the maximum amplitude of the voltage signal.

In yet another embodiment of the present invention, the rectifier has at least one control grid and has its operation blocked so that the rectifier is effective only during predetermined time periods. These predetermined time periods depend upon the occurrence of the retrace signals used in the cathode ray tube.

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

Figure 1:
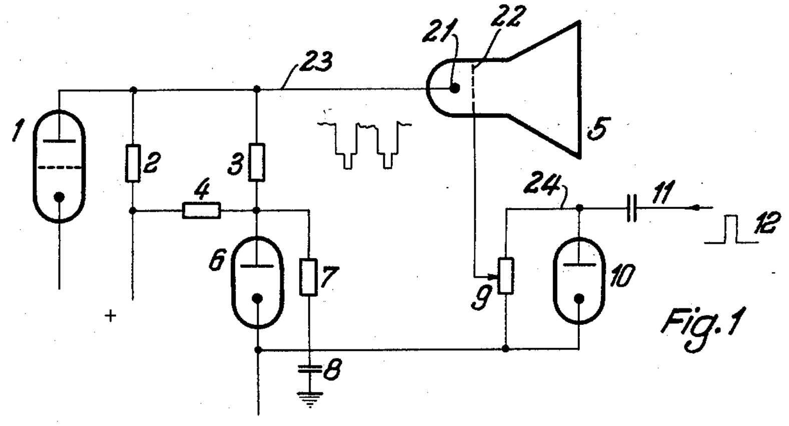
Fig. 1 is an electrical schematic diagram of one embodiment of the present invention.

Referring to the drawings and more particularly to Fig. 1, it can be seen that the cathode ray tube 5 has a cathode 21 and a control electrode 22. The cathode 21 is connected by means of a conductor 23 to the anode of a tube 1. The tube 1 is the video amplifier tube used in television receivers and has a control electrode which is adapted to be connected to the transmitted television signal.

Also connected to the conductor 23 is a resistor 3 which has its other end connected to the anode of a rectifier 6. This anode is connected to the anode of the tube 1 through the resistors 2 and 4.

Figures 2, 3:
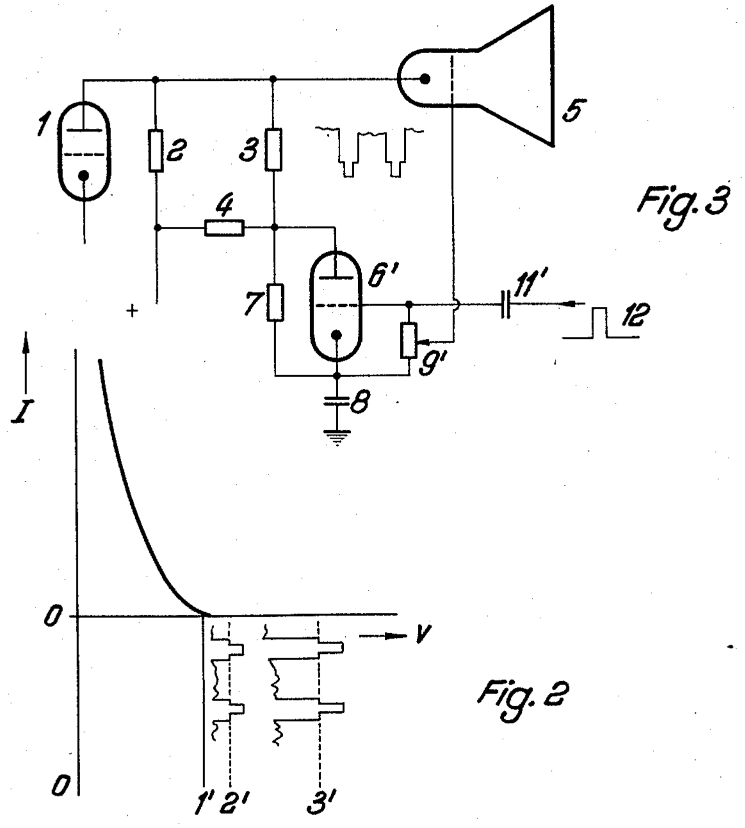
Fig. 2 is a graphical representation indicating the current flow in the cathode ray tube of the television receiver in accordance with the embodiment as shown in Fig. 1.
Fig. 3 is an electrical schematic diagram of a second embodiment of the present invention.

The cathode of the rectifier 6 is connected, as shown in Fig. 3 to ground by means of a capacitor 8 and connected between the anode and cathode of the rectifier 6 is a resistor 7.

Connected to the control electrode 22 of the cathode ray tube 5, is the tap of a potentiometer 9. One end of the potentiometer 9 is connected by a conductor 24 to the anode of a second rectifier 10 and the other end of the potentiometer 9 is connected to the cathode of the rectifier 10 and to the cathode of the rectifier 6.

Shown in Fig. 1 is the wave shape 12 of the retrace signal which is adapted to be applied to the control electrode 22 of the cathode ray tube 5 through the capacitor 11. As is well known in television receiver circuits, the retrace signal is used to quickly return the spot of the cathode ray tube back to its starting point at an opposite side of the picture being traced on the screen of the cathode ray tube.

In operation, the video signal applied to the control electrode of the video amplifier 1 is amplified and applied to the cathode 21 of the cathode ray tube 5. A portion of this amplified signal is also applied to the anode of the rectifier 6 through the voltage divider resistors 3 and 4. The exact portion of the voltage signal applied to the anode of the rectifier 6 depends on the relative magnitudes of the resistors 3 and 4. Adjacent the conductor 23 is shown the shape of the video signal applied to the cathode of the tube 5.

The portion of the voltage applied to the anode of the rectifier 6 is rectified and charges the capacitor 8 to a value depending on the value of the resistor 7 in addition to the amplitude of the voltage applied to the rectifier 6. If desired, the portion of the voltage signal which is used to charge the capacitor 8 may be made precisely equal to the black signal level for the cathode ray tube by properly adjusting the values of the resistors 3, 4 and 7.

The negative bias potential for the control electrode 22 of the cathode ray tube 5 will therefore include the voltage across the capacitor 8. This negative bias potential can be provided by the rectification of the retraced signals 12 in the rectifier 10 and properly adjusted in the potentiometer 9.

Referring now to Fig. 2, the operation of the current flow in the cathode ray tube 5 will be further explained. In Fig. 2, the voltage on the cathode 21, V, is plotted along the X-axis or the abscissa. The current in the cathode ray tube 5, I, is plotted along the Y-axis or the ordinate of the graph. Therefore, the cathode ray tube current I is shown as a function of the voltage of the cathode V.

The reference line 1' of Fig. 2 corresponds to the current flow through the tube 5 when no voltage is applied to the control electrode 22 thereof. Accordingly, this voltage plotted on the graph is equal to the bias potential of the control electrode 22 which brings the tube current to zero or its cut-off point, thereby darkening the tube.

When a small signal is introduced, corresponding to a small contrast, a positive voltage 2' is applied to the capacitor 8 of Fig. 1. The voltage 2' corresponds to the voltage amplitude of the black signal level. This is indicated by the dotted line which crosses the wave form in Fig. 2 at the shoulder portion. As is well known, with television transmitted signals, the portion of the wave having an amplitude larger than the black signal level is used for synchronizing purposes and does not contribute to the picture on the tube 5. This synchronizing portion, in Fig. 2, is shown to the right of the dotted line 2'. It can therefore be seen that the black level signal has a leading and trailing edge, which are sharply rectangular both before and after the synchronizing portion of the transmitted voltage signal.

It can be seen from the graph of Fig. 2 that the application of the voltage 2' displaces the voltage on the control electrode 22 of the tube 5 in a positive direction by an amount equal to the voltage difference between the lines 1' and 2'. Accordingly, the black signal level of the picture tube 5 remains fixed at the same point.

When a larger signal corresponding to a larger contrast is applied to the cathode 21, a larger displacement corresponding to the voltage level 3' is achieved. This voltage 3' is applied to the capacitor 8 in a positive direction to displace the voltage applied to the control electrode by this amount. Accordingly this maintains the black signal level applied to the cathode ray tube at precisely the desired amplitude.

As can be seen from Fig. 2 the black signal level is thereby maintained completely independent from the particular position of the contrast. Therefore only the contrast adjustment must be carried out in the receiver, the black signal level corresponding to the brightness being automatically adjusted by the apparatus incorporating the principles of the present invention.

The arrangement shown in Fig. 1 provides at the anode of the rectifier 6 a voltage signal which can be used for the amplitude discriminator in the television receiver and can be connected thereto. In such a case the diode 6 would operate as a limiter against noise voltages and suppress the same in the television receiver.

As a further improvement of the present invention the rectification of the signal voltage applied to the cathode 21 of the cathode ray tube 5 can be carried out only during the application of the line synchronizing signal. In this manner the rectification will be keyed to the line synchronizing signal. For this purpose a triode or a tube having more than one control grid can be used. The noise voltage produced in the television receiver will thereby be reduced with respect to the brightness on the picture tube 5 by a factor which corresponds to the ratio between the total time of transmission compared to the time during which the rectifier is keyed to control the picture brightness.

A second advantage of such as arrangement is provided by the fact that the keying impulse can be simultaneously used by grid current rectification for producing the negative bias potential for the control electrode.

An example of this preferred embodiment is shown in Fig. 3. The arrangement shown in Fig. 3 corresponds to the arrangement shown in Fig. 1 except that the rectifier 6' has a control grid which is connected to one side of the potentiometer 9'. The retrace signal 12 is applied through the capacitor 11' to the control grid of the tube 6'. By grid current rectification of the retrace signal 12 a negative voltage is produced which blocks the tube 6'. Accordingly, the only time that the tube 6' is free to operate is during the application of the retrace signals 12. The negative bias potential which is obtained at the grid resistor 9 can be used as an adjustable bias potential for the control electrode of the cathode ray tube 5.

A further possibility is permitted with this arrangement by applying the keying impulse from the voltage signal with such a delay to the grid of the tube 6' that the retrace signals will be synchronized with the trailing edge of the black signal voltage level. The peak voltage of the capacitor 8 which corresponds to the height of the trailing edge of the black signal voltage and is obtained from the voltage divider 3 and 4 can then be done away with.

The method carried out by the apparatus shown in Fig. 1 can also be used for positive picture modulation although it has been described herein with negative picture modulation. As indicated hereinabove the use of the voltage dividers 3 and 4 permits the voltage rectified in the rectifier 6 to be reduced to correspond to precisely the level of the black signal voltage as compared to the total signal voltage which includes the larger amplitude synchronizing impulses.

It will be understood that each of the elements described above, or two or more together, may also find a useful application in other types of control circuits differing from the types described above.

While the invention has been illustrated and described as embodied in an apparatus for automatically controlling the brightness of a picture tube in television receivers, it is not intended to be limited to the details shown, since various modifications and structural changes may be made without departing in any way from the spirit of the present invention.

The present invention has been described with respect to a cathode ray tube used as a picture tube for television receivers. It is clear that the same arrangement can be used to control brightness in any other types of picture tubes if any are available.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

In an arrangement for automatically controlling the brightness in a cathode ray tube used as a picture tube for a television receiver, said cathode ray tube having at least a cathode and a control electrode, in combination, input means connected in circuit with the cathode of the cathode ray tube and adapted to have a voltage signal applied thereto to be displayed on said cathode ray tube, said voltage signal including keying impulses and retrace signal impulses contributing to synchronizing operation of said television receiver, said voltage signal having a black signal level of smaller amplitude than the maximum amplitude of said voltage signal, and said input means including a video rectifier and amplifier stage, and a direct current connection thereof with said cathode of said cathode ray tube, said rectifier stage including a rectifier tube having a cathode electrode, an anode and at least one control grid, said anode being connected in circuit with said cathode of said cathode ray tube; resistive bypass means connected in parallel with the cathode-anode circuit of said rectifier tube; capacitor means connected between said cathode electrode and ground to be charged by a portion of said voltage signal; an electrically conductive voltage divider means connected in circuit between said anode of said rectifier tube and said cathode of said cathode ray tube for applying a portion of said voltage signal to the anode-cathode circuit of said rectifier tube for rectification therein, said portion of said voltage signal corresponding substantially to the ratio between said black signal level and said maximum voltage amplitude level; means for applying said retrace signal impulses to said control grid of said rectifier tube for rectifying the same by grid current rectification and for temporarily blocking thereby said rectifier tube periodically upon application of said retrace signal impulses; and adjustable voltage divider means connected in parallel with said control grid and said cathode electrode of said rectifier tube, said adjustable voltage divider means having a slideable tap connected with said control electrode of said cathode ray tube for applying an adjustable portion of said signal voltage portion rectified in said rectifier tube in addition to the charge potential of said capacitor means as a negative bias voltage to said control electrode of said cathode ray tube during the periods in which said rectifier tube is not blocked.

References Cited in the file of this patent

UNITED STATES PATENTS

| | | |
|---|---|---|
| 2,240,281 | Ballard | Apr. 29, 1941 |
| 2,611,881 | Hulst | Sept. 23, 1952 |
| 2,672,505 | Schwarz | Mar. 16, 1954 |
| 2,673,892 | Richman | Mar. 30, 1954 |

FOREIGN PATENTS

| | | |
|---|---|---|
| 1,091,100 | France | Apr. 6, 1955 |

OTHER REFERENCES

Rider's Television Manual, vol. 2, GE TV Pages 2–19, 20 (GE Model 803), copyrighted 1949; copy in Library.